(12) United States Patent
Spolaore

(10) Patent No.: US 12,244,912 B1
(45) Date of Patent: Mar. 4, 2025

(54) SYSTEM AND METHOD FOR DETERMINING PERFORMANCE OF AN IMAGING DEVICE IN REAL-TIME

(71) Applicant: Rockwell Collins, Inc., Cedar Rapids, IA (US)

(72) Inventor: Guillaume Spolaore, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 186 days.

(21) Appl. No.: 18/130,244

(22) Filed: Apr. 3, 2023

(51) Int. Cl.
| | |
|---|---|
| *H04N 23/13* | (2023.01) |
| *G01W 1/18* | (2006.01) |
| *H04N 23/60* | (2023.01) |
| *H04N 23/90* | (2023.01) |
| *H04N 23/951* | (2023.01) |

(52) U.S. Cl.
CPC .............. *H04N 23/13* (2023.01); *G01W 1/18* (2013.01); *H04N 23/64* (2023.01); *H04N 23/90* (2023.01); *H04N 23/951* (2023.01); *G01W 2203/00* (2013.01)

(58) Field of Classification Search
CPC ........ H04N 23/13; H04N 23/64; H04N 23/90; H04N 23/951; G01W 1/18; G01W 2203/00
See application file for complete search history.

(56) References Cited

U.S. PATENT DOCUMENTS

| | | | |
|---|---|---|---|
| 9,986,233 B1 | 5/2018 | Curlander et al. | |
| 10,051,178 B2 * | 8/2018 | Tebay | .................... H04N 23/64 |
| 10,404,949 B2 * | 9/2019 | Lee | ..................... H04N 1/00137 |
| 10,447,995 B1 | 10/2019 | Curlander et al. | |
| 10,475,209 B2 | 11/2019 | Shen et al. | |
| 10,560,690 B2 | 2/2020 | Malaescu et al. | |
| 11,024,187 B2 | 6/2021 | Staudinger et al. | |
| 11,310,423 B2 | 4/2022 | Kuo et al. | |
| 11,538,349 B2 | 12/2022 | Poojary et al. | |
| 2014/0327765 A1 | 11/2014 | Hsien et al. | |
| 2017/0054920 A1 * | 2/2017 | de Boer | ................. H04N 23/90 |
| 2018/0108150 A1 * | 4/2018 | Curtis | ..................... G06T 7/246 |
| 2019/0108743 A1 * | 4/2019 | Kimura | ............. G08B 21/0261 |
| 2020/0134872 A1 | 4/2020 | Feng et al. | |

(Continued)

FOREIGN PATENT DOCUMENTS

EP  2416558 A4  6/2017

*Primary Examiner* — Hung H Lam
(74) *Attorney, Agent, or Firm* — Suiter Swantz IP

(57) ABSTRACT

A method for determining performance of an imaging device in real-time is disclosed. The method may include, but is not limited to, receiving a first set of images of a first calibration target positioned at a first position from one or more imaging devices, determining a first environmental condition external to the aircraft at the first position based on the received first set of images using a machine learning algorithm; receiving additional set of images of an additional calibration target positioned at an additional position from the one or more imaging devices; determining an additional environmental condition external to the aircraft at the additional position based on the received additional set of images; and determining one or more real-time calibration parameters for the one or more imaging devices based on at least one of the determined first environmental condition and the determined additional environment condition.

15 Claims, 7 Drawing Sheets

(56) References Cited

U.S. PATENT DOCUMENTS

| | | |
|---|---|---|
| 2020/0327696 A1 | 10/2020 | Habib |
| 2021/0201534 A1 | 7/2021 | Liang et al. |
| 2022/0058966 A1 | 2/2022 | Baranek et al. |
| 2022/0100206 A1 | 3/2022 | Muller et al. |
| 2022/0327741 A1 | 10/2022 | Rahmouni et al. |
| 2023/0023069 A1 | 1/2023 | Gariel et al. |
| 2023/0117253 A1* | 4/2023 | Molad ........................ G06T 7/20 382/103 |
| 2023/0401745 A1* | 12/2023 | Kothari ...................... G06T 7/70 |
| 2024/0094726 A1* | 3/2024 | Katz .................... G05D 1/0055 |

* cited by examiner

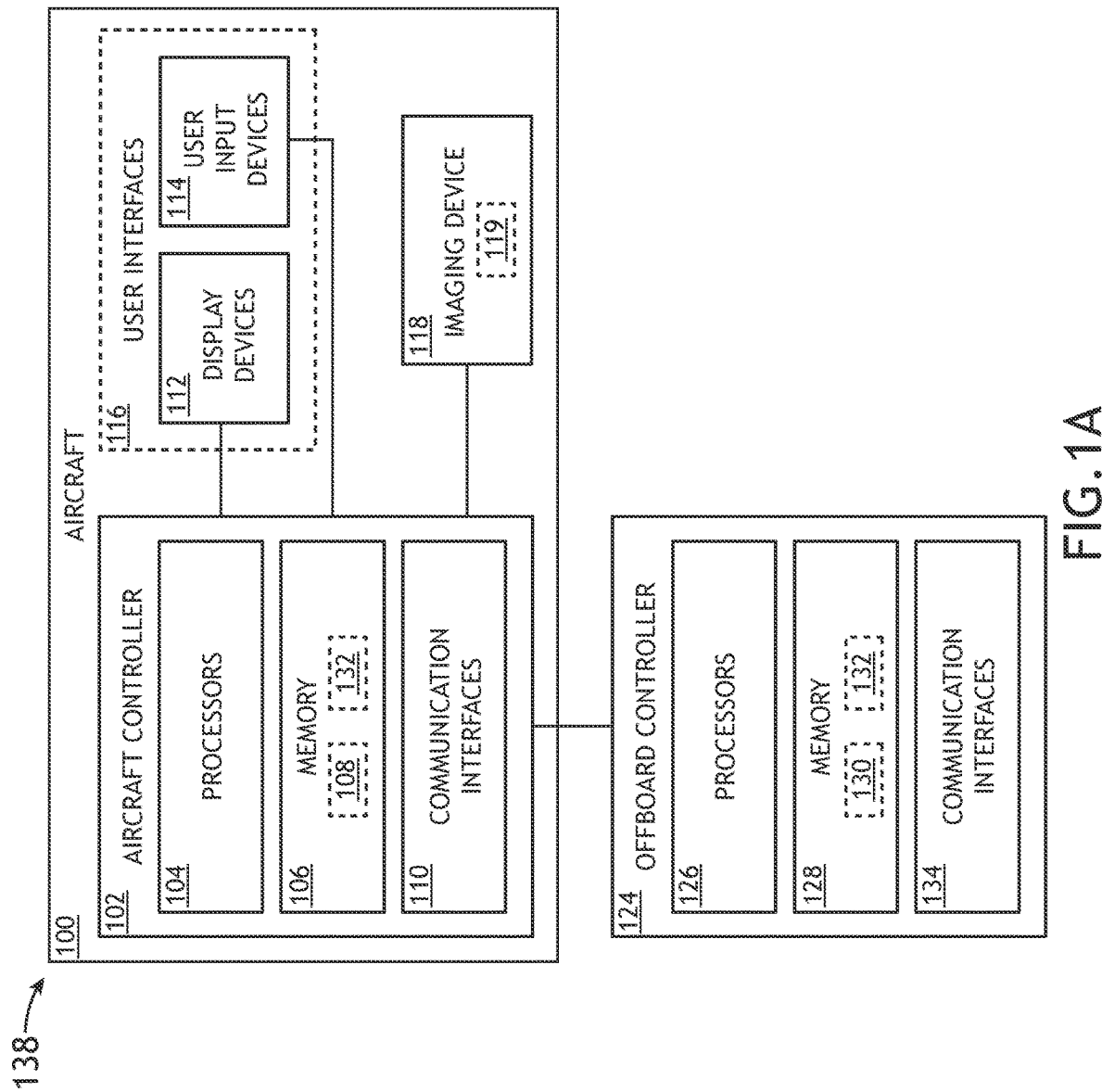

SYSTEM AND METHOD FOR DETERMINING PERFORMANCE OF AN IMAGING DEVICE IN REAL-TIME

BACKGROUND

The usage of imaging devices in aircraft will increase over time. Without proper calibration, the imaging device will provide inaccurate measurements and results. Imaging devices are extremely sensitive to weather conditions and an improper calibration of such device may alter detection performance or lead to a false detection. As such, there is a need for a system and method for determining imaging device performance in real-time.

SUMMARY

A system for determining performance of an imaging device in real-time is disclosed, in accordance with one or more embodiments of the present disclosure. In embodiments, the system includes one or more imaging devices coupled to one or more external surfaces of an aircraft, the one or more imaging devices configured to generate a first set of images of a first calibration target positioned at a first position and an additional set of images of an additional calibration target positioned at an additional position, wherein the first position is different from the additional position, the first calibration target including a first calibration pattern, the additional calibration target including a second calibration pattern. In embodiments, the system includes one or more controllers communicatively coupled to the one or more imaging devices, the one or more controllers including one or more processors configured to executed a set program instructions stored in a memory, the one or more controllers including a machine learning algorithm stored in memory, the set of program instructions configured to cause the one or more processors to: receive the first set of images of the first calibration target positioned at the first position from the one or more imaging devices; determine a first environmental condition external to the aircraft at the first position based on the received first set of images using the machine learning algorithm; receive the additional set of images of the additional calibration target positioned at the additional position from the one or more imaging devices; determine an additional environmental condition external to the aircraft at the additional position based on the received additional set of images; and determine one or more real-time calibration parameters for the one or more imaging devices based on at least one of the determined first environmental condition and the determined additional environment condition.

In some embodiments, the one or more controllers may be further configured to adjust one or more factory calibration parameters based on the determined one or more real-time calibration parameters.

In some embodiments, the one or more controllers may be further configured to receive one or more training images, the one or more training images include one or more weather condition images and train the machine learning algorithm based on the received one or more training images.

In some embodiments, one of the first calibration pattern or the additional calibration target may include a fixed calibration pattern.

In some embodiments, one of the first calibration pattern or the additional calibration target may include a dynamic calibration pattern.

In some embodiments, one of the first calibration target or the additional calibration target may include a digital display device.

In some embodiments, one of the first position of the first calibration target or the additional position of the additional calibration target may include a taxiway position, a runway position, or a position outside an airport.

A method for determining performance of an imaging device in real-time is disclosed, in accordance with one or more embodiments of the present disclosure. In embodiments, the method includes receiving a first set of images of a first calibration target positioned at a first position from one or more imaging devices, the one or more imaging devices coupled to one or more external surfaces of an aircraft, the first calibration target including a first calibration pattern. In embodiments, the method includes determining a first environmental condition external to the aircraft at the first position based on the received first set of images using a machine learning algorithm. In embodiments, the method includes receiving additional set of images of an additional calibration target positioned at an additional position from the one or more imaging devices, the additional position different from the first position, the additional calibration target including an additional calibration pattern. In embodiments, the method includes determining an additional environmental condition external to the aircraft at the additional position based on the received additional set of images. In embodiments, the method includes determining one or more real-time calibration parameters for the one or more imaging devices based on at least one of the determined first environmental condition and the determined additional environment condition.

In some embodiments, the one or more controllers may be further configured to adjust one or more factory calibration parameters based on the determined one or more real-time calibration parameters.

In some embodiments, the one or more controllers may be further configured to receive one or more training images, the one or more training images include one or more weather condition images and train the machine learning algorithm based on the received one or more training images.

In some embodiments, one of the first calibration pattern or the additional calibration target may include a fixed calibration pattern.

In some embodiments, one of the first calibration pattern or the additional calibration target may include a dynamic calibration pattern.

In some embodiments, one of the first calibration target or the additional calibration target may include a digital display device.

In some embodiments, one of the first position of the first calibration target or the additional position of the additional calibration target may include a taxiway position, a runway position, or a position outside an airport.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1A illustrates a simplified block diagram of an aircraft including a system for determining performance on an imaging device in real-time, in accordance with one or more embodiments of the present disclosure.

DETAILED DESCRIPTION OF THE INVENTION

Figure 1B:
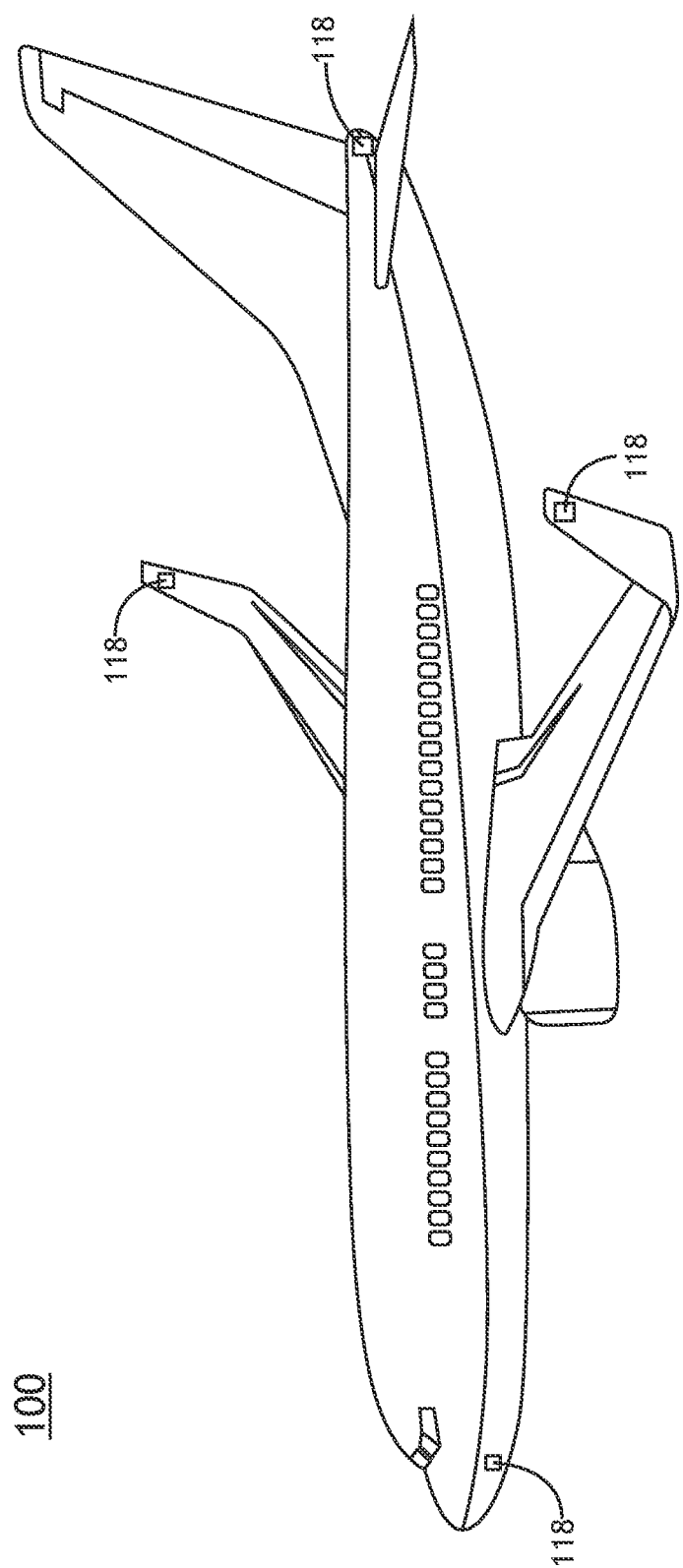
FIG. 1B illustrates a simplified schematic of an aircraft including a system for determining performance of an imaging device in real-time, in accordance with one or more embodiments of the present disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

The usage of imaging devices in aircraft will increase over time. Calibration of imaging devices is important to ensure accurate measurements and results. Conventional calibration methods are performed in a clean and controlled environment such as a laboratory or an indoor space where the environmental condition(s) are static. However, imaging devices are extremely sensitive to weather conditions and an improper calibration of such device may alter detection performance or lead to a false detection.

As such, there is a need for a system and method for determining imaging device performance in real-time that cures one or more shortfalls of the previous approaches discussed above. The system should determine performance of an imaging device in real-time (or near real-time), where the imaging device may be calibrated based on real-time (or near real-time) environmental conditions external to the aircraft. For example, the system should be configured to perform real-time calibration based on two or more calibration targets positioned along two or more points on the taxiway, runway, or point outside the airport. In this regard, the imaging device(s) on the aircraft may be calibrated prior to take-off or landing based on real-time weather conditions.

FIGS. 1A-3 generally illustrate a system and method for determining imaging device performance in real-time, in accordance with one or more embodiments of the disclosure.

Referring now to FIGS. 1A-1D, the aircraft 100 may include an aircraft controller 102. The aircraft controller 102 may include one or more processors 104, memory 106 configured to store one or more program instructions 108 and one or more machine learning algorithms 132, and/or one or more communication interfaces 110.

The aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more imaging devices 118. The one or more imaging devices 118 may be configured to sense a particular condition(s) external to the aircraft 100. For example, the one or more imaging devices 118 may be configured to sense an environmental condition external to the aircraft 100. In one instance, the one or more imaging devices 118 may be configured to sense a weather condition (e.g., rain, fog, snow, cloudy, sunny, or the like) external to the aircraft 100 in near real-time or real-time. In another instance, the one or more imaging devices 118 may be configured to sense a temperature external to the aircraft 100 in near real-time or real-time. In this regard, the one or more imaging devices 118 may be configured to sense the real-time (or near real-time) environment conditions external to the aircraft 100, such that the one or more imaging devices 118 may be calibrated based on the real-time environment, as will be discussed further herein.

The one or more imaging devices 118 may be coupled (e.g., physically, electrically, and/or communicatively) to one or more image processing processors 119. The one or more image processing processors 119 may be configured to perform one or more image processing steps, as will be discussed further herein. The one or more image processing processors 119 may be housed on-board the aircraft 100. For example, the one or more image processing processors 119 may be housed within the one or more imaging devices 118. By way of another example, the one or more image processing processors 119 may be housed external to the one or more imaging devices 118. In some embodiments, the one or more imaging devices 118 may be coupled to the offboard controller 124, where the one or more processors 126 may perform one or more image processing steps.

The one or more imaging devices 118 may be configured to output data associated with particular sensed condition(s) to one or more components/systems onboard the aircraft 100. For example, the one or more imaging devices 118 may be configured to output data associated with the sensed environmental condition and provide such information to one or more components/systems onboard the aircraft 100.

Referring to FIG. 1B, the one or more imaging devices 118 may be coupled to an external surface of the aircraft 100. For example, the one or more imaging devices 118 may be coupled to a nose of the aircraft 100. By way of another example, the one or more imaging devices 118 may be coupled to a wing of the aircraft 100. By way of another example, the one or more imaging devices 118 may be coupled to a tail of the aircraft 100. By way of another example, the one or more imaging devices 118 may be coupled to a portion of the fuselage (or body) of the aircraft 100.

It is noted that the configuration (e.g., number, location, and the like) of imaging devices 118 depicted in FIG. 1B is provided merely for illustrative purposes and shall not be construed as limiting the scope of the present disclosure.

Figure 1C:
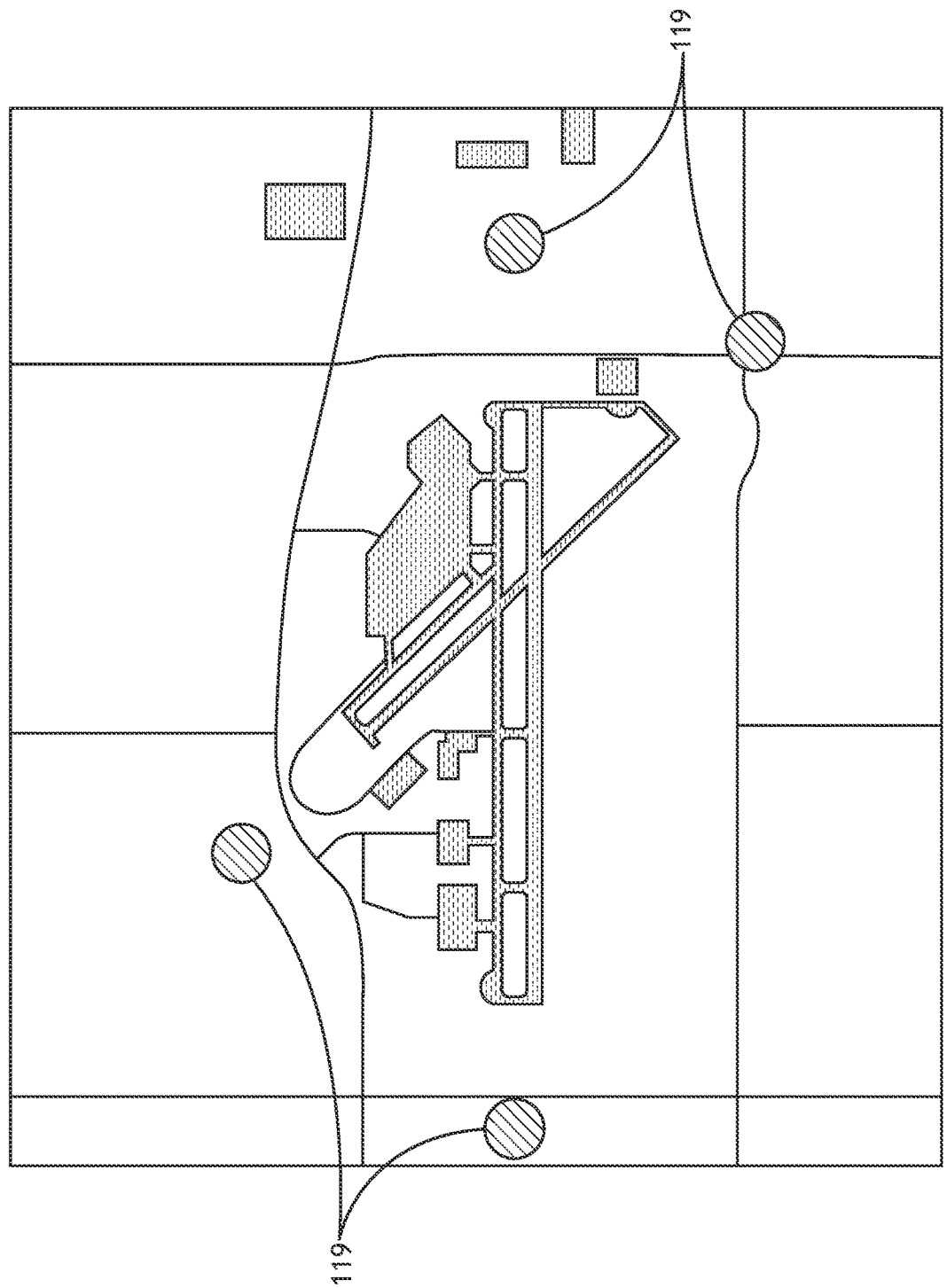
FIG. 1C illustrates a simplified schematic of the aircraft including the system for determining performance of the imaging device in real-time, in accordance with one or more embodiments of the present disclosure.
Figure 1D:
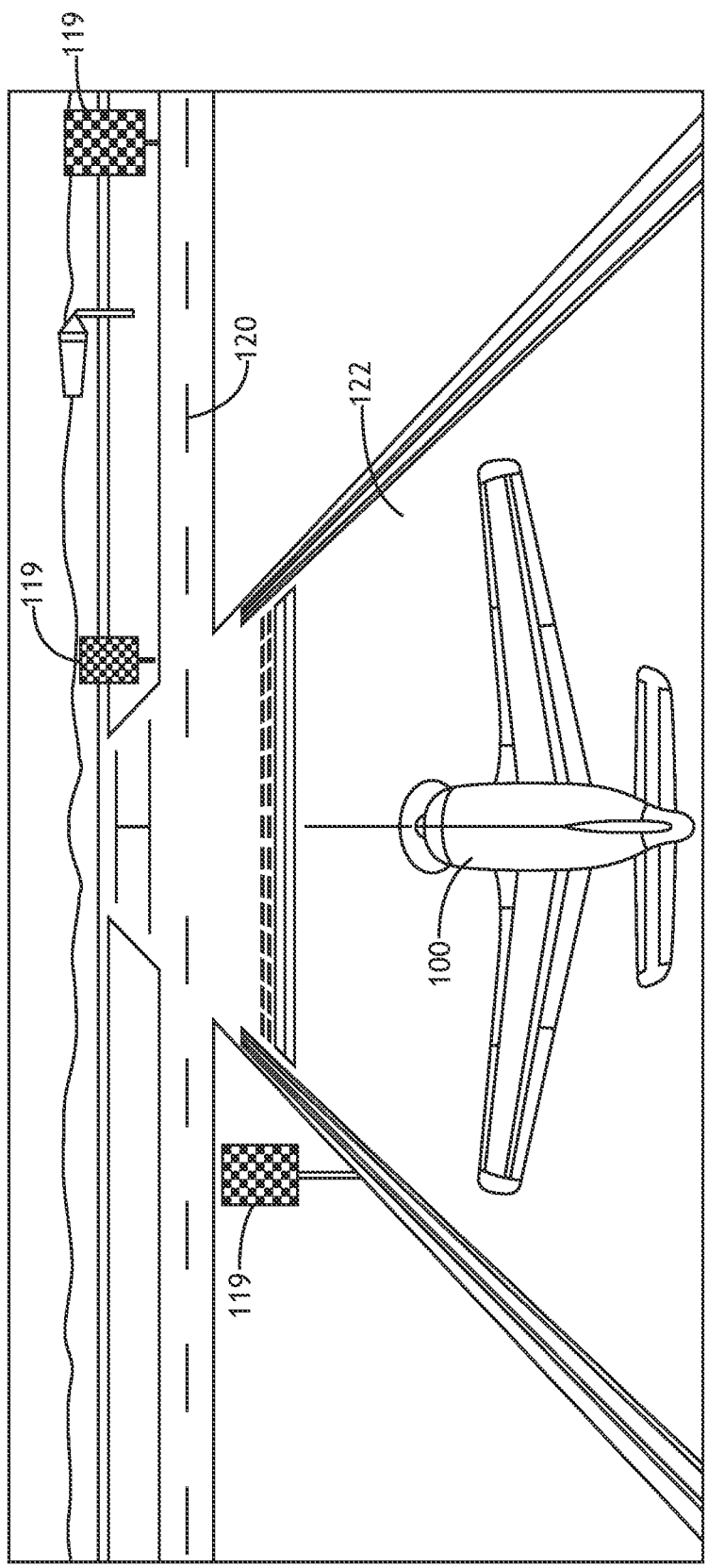
FIG. 1D illustrates a simplified schematic of the aircraft including the system for determining performance of the imaging device in real-time, in accordance with one or more embodiments of the present disclosure.

Referring to FIGS. 1C-1D, the one or more imaging devices 118 may be configured to generate one or more images of one or more calibration targets 119 positioned proximate to the aircraft 100. For example, the calibration targets 119 may be positioned along one or more portions of a taxiway 120. By way of another example, the calibration targets 119 may be positioned along one or more portions of a runway 122. By way of another example, the calibration targets 119 may be positioned along one or more portions outside the airport for landing preparation.

Figure 2E:
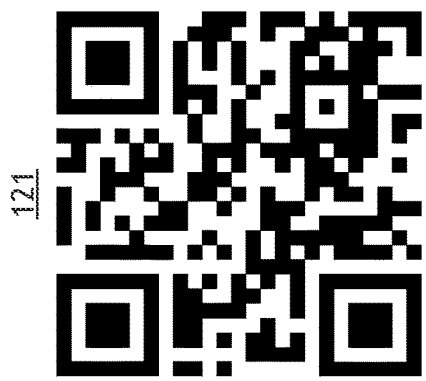
FIGS. 2A-2F illustrates simplified schematics of calibration patterns for a calibration target, in accordance with one or more embodiments of the present disclosure.
Figure 2D:
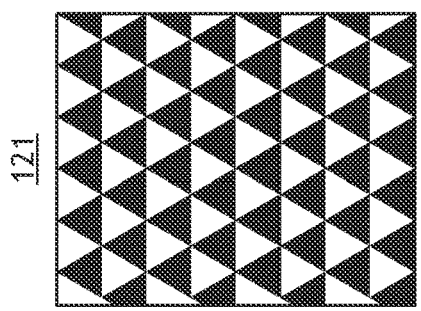
Figure 2C:
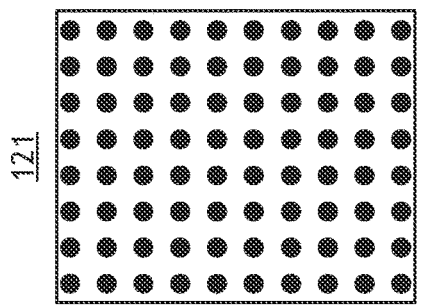
Figure 2B:
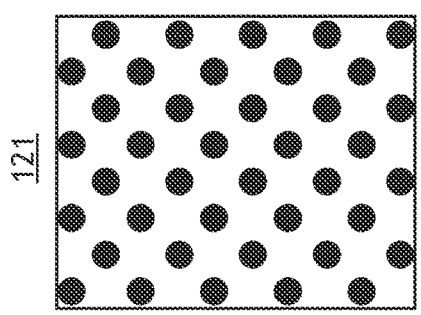
Figure 2A:
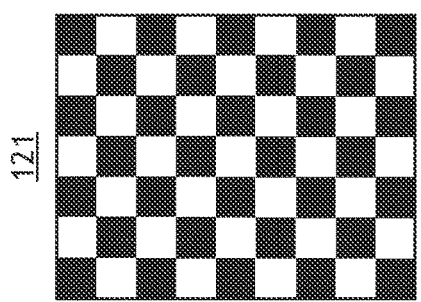
Figure 2F:
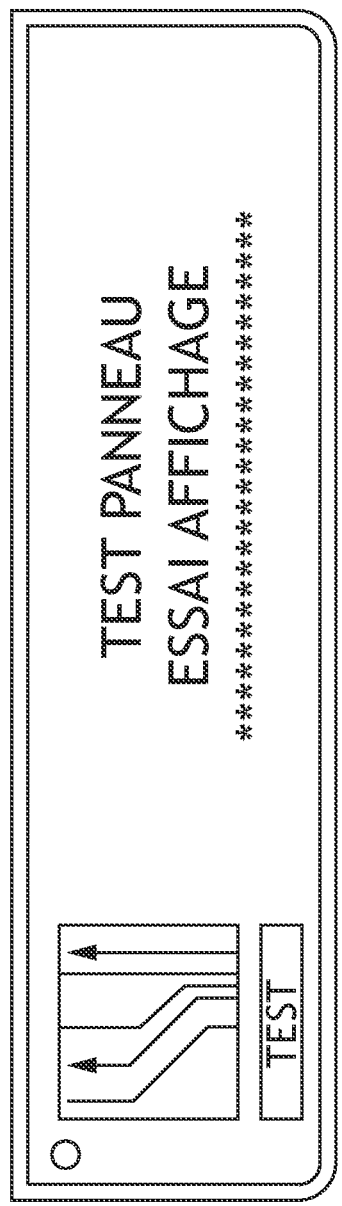

Referring to FIGS. 2A-2E, the calibration targets 119 may include a calibration pattern 121. For example, as shown in FIG. 2A, the calibration pattern 121 may include a checkboard pattern. By way of another example, as shown in FIG. 2B, the calibration pattern 121 may include a large dot pattern. By way of another example, as shown in FIG. 2C, the calibration pattern 121 may include a small dot pattern. By way of another example, as shown in FIG. 2D, the calibration pattern 121 may include a triangle pattern. By way of another example, as shown in FIG. 2E, the calibration pattern 121 may include a QR-code pattern. By way of another example, as shown in FIG. 2F, the calibration pattern 121 may include an image, graphic, or video. By way of another example, the calibration pattern 121 may include a barcode.

The calibration pattern 121 may include a fixed calibration pattern or a static calibration pattern. For example, where the calibration pattern 121 is a fixed pattern, the calibration target 119 may include a fixed target such as, but not limited to, a sign, a banner, or the like. By way of another example, where the calibration pattern 121 is a dynamic pattern, the calibration target 119 may include a digital screen/display. For instance, the digital calibration target 119 may be configured to adjust the pattern or one or more characteristics of the pattern (e.g., color, intensity, or the like).

The aircraft controller 102 may be coupled (e.g., physically, electrically, and/or communicatively) to and configured to receive data from one or more aircraft sensors. The one or more aircraft sensors may be configured to sense a particular condition(s) external or internal to the aircraft 100 and/or within the aircraft 100. The one or more aircraft sensors may be configured to output data associated with particular sensed condition(s) to one or more components/systems onboard the aircraft 100. Generally, the one or more aircraft sensors may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

It is noted that the sensor output data may be used to validate calibration parameters as a redundant path. For example, if the sensor output data indicates that the temperature is cold and the one or more imaging devices 118 are calibrated using a "warm" calibration parameter, the sensor data would indicate that calibration was performed incorrectly.

The aircraft controller 102 of the aircraft 100 may be coupled (e.g., physically, electrically, and/or communicatively) to one or more offboard controllers 124. For example, the one or more offboard controllers 124 may be in possession of an air traffic control tower, in possession of an offboard ground maintenance crew, in possession of a manufacturing line operator, in possession of a quality control tester, or the like.

The one or more offboard controllers 124 may include one or more processors 126, memory 128 configured to store one or more programs instructions 130 and/or one or more machine learning algorithms 132, and/or one or more communication interfaces 134. The output of the machine learning algorithms 132 may be transmitted to the aircraft controller 102.

The one or more machine learning algorithms 132 may include one or more machine learning algorithms used to identify a weather condition external to the aircraft 100. In generating the machine learning algorithm, the controller may be configured to acquire one or more training images of one or more external conditions. For example, the controller may be configured to receive one or more training images of one or more external weather conditions from a remote database. For purposes of the present disclosure, the term "training imaging" may be regarded as images of environmental conditions whose type are known and that will be used as inputs to training the machine learning algorithm. Once trained, the machine learning algorithm may be used by the one or more imaging devices 118 to sense a real-time environmental condition external to the aircraft 100. For example, the one or more imaging devices 118 may be configured to determine a weather condition external to the aircraft in real-time (or near real-time) using the machine learning algorithm. In this regard, the one or more imaging devices 118 may be able to determine whether it is rainy, snowy, foggy, cloudy, sunny, or the like, such that the one or imaging devices 118 may be calibrated accordingly (as will be discussed further herein).

It is noted herein that the controller may be configured to generate the machine learning algorithm via any technique known in the art including, but not limited to, supervised learning, unsupervised learning, and the like.

It is further noted herein that the machine learning algorithm may include any type of machine learning algorithm and/or deep learning algorithm known in the art including, but not limited to, a random forest classifier, a support vector machine (SVM) classifier, an ensemble learning classifier, an artificial neural network (ANN), and the like. By way of another example, the machine learning algorithm may include a deep convolutional neural network. For instance, in some embodiments, the machine learning algorithm may include ALEXNET and/or GOOGLENET. In this regard, the machine learning algorithm may include any algorithm, classifier, or predictive model configured to determine an environmental condition external to the aircraft 100 using the one or more imaging devices 118.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal I component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 3:
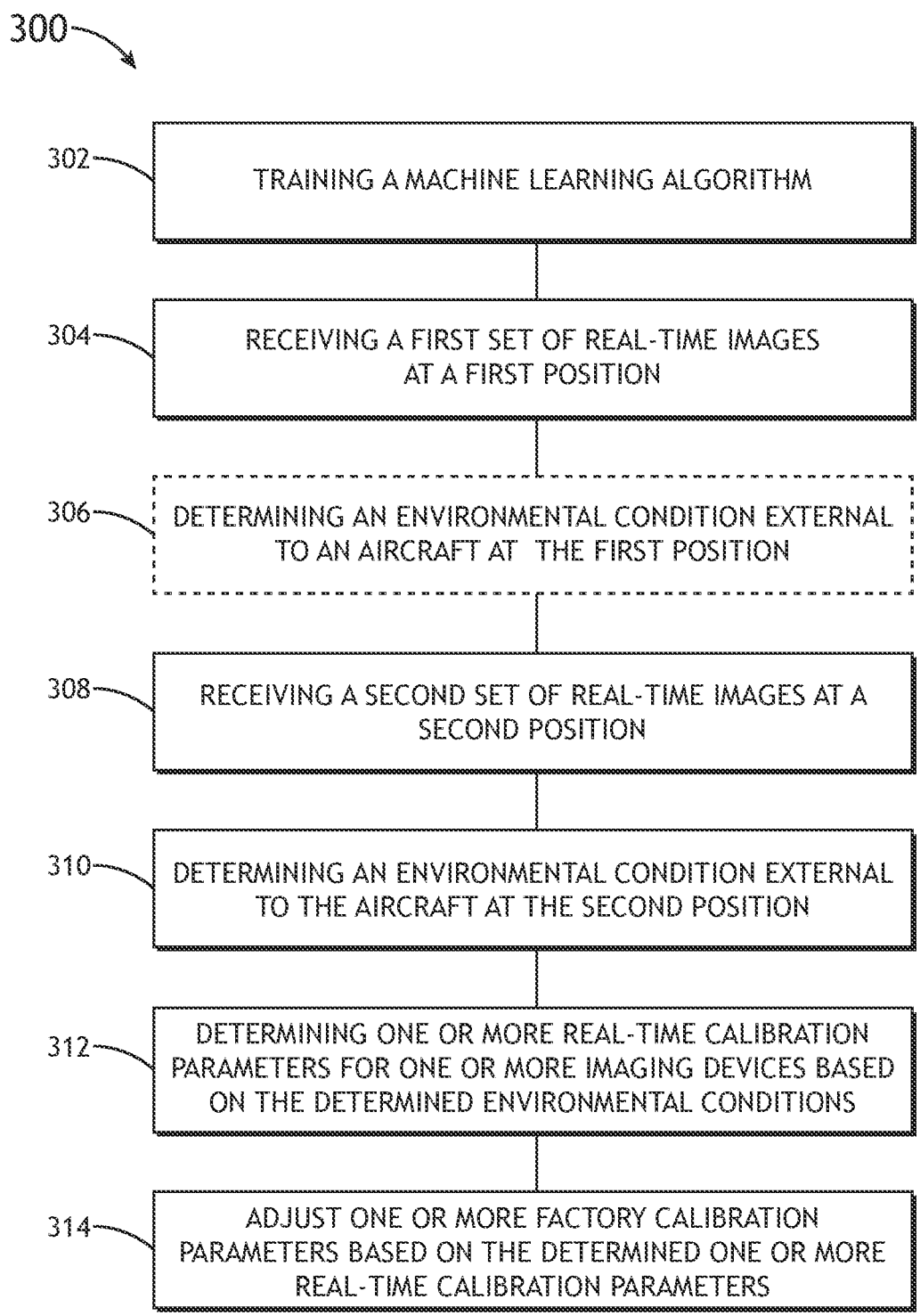
FIG. 3 illustrates a flowchart depicting a method or process for determining performance of an imaging device in real-time, in accordance with one or more embodiments of the present disclosure.

Referring now to FIG. 3, a method or process 300 for determining performance of an imaging device 118 is disclosed, in accordance with one or more embodiments of the disclosure.

In a step 302, a machine learning algorithm may be trained. For example, the controller may be configured to receive one or more training images. For instance, the controller may be configured to receive one or more training images of one or more external weather conditions from a remote database.

In a step 304, a first set of real-time images may be received at a first position. For example, the one or more imaging devices 118 may be configured to generate a first set of real-time images of a first calibration device at a first position. In one instance, the one or more imaging devices 118 of the aircraft 100 may be configured to generate a first set of real-time images of a first calibration device 119 positioned on the runway 120. In another instance, the one or more imaging devices 118 of the aircraft 100 may be configured to generate a first set of real-time images of a first calibration device 119 positioned on the taxiway 122. In another instance, the one or more imaging devices 118 of the aircraft 100 may be configured to generate a first set of real-time images of a first calibration device 119 positioned outside the airport (for landing preparation).

In some embodiments, the first set of real-time images received at the first position may be stored in memory. For example, as will be discussed further herein, the controller may be configured to average one or more images of one or more calibration targets 119 to determine an environmental condition external to the aircraft, such that the controller may be configured to determine one or more real-time calibration parameters for the one or more imaging devices 118 based on the averaged images.

In an optional step 306, an environmental condition external to the aircraft may be determined at the first position. For example, using the trained machine learning algorithm, the controller may be configured to perform fast detection to determine a weather condition external to the aircraft 100 based on the first image of the first calibration target 119. For instance, using the machine learning algorithm, the controller may be configured to determine whether it is raining, snowing, foggy, sunny, cloudy, or the like.

In a step 308, a second set of real-time images may be received at a second position, where the second position is different from the first position. For example, the one or more imaging devices 118 may be configured to generate a second set of real-time images of a second calibration device at a second position, where the second calibration device is different than the first calibration device. In one instance, the one or more imaging devices 118 of the aircraft 100 may be configured to generate a second set of real-time images of a second calibration device 119 positioned on the runway 120. In another instance, the one or more imaging devices 118 of the aircraft 100 may be configured to generate a second set of real-time images of a second calibration device 119 positioned on the taxiway 122. In another instance, the one or more imaging devices 118 of the aircraft 100 may be configured to generate a second set of real-time images of a second calibration device 119 positioned outside the airport (for landing preparation).

In a step 310, an environmental condition external to the aircraft may be determined at the second position. For example, using the trained machine learning algorithm, the controller may be configured to determine a weather condition external to the aircraft 100 based on the first image of the first calibration target 119 stored in memory and at least the second image of the second calibration target 119. For instance, using the trained machine learning algorithm, the controller may determine a weather condition by averaging at least the first image of the first calibration target and the second image of the second calibration target 119. In this regard, using the machine learning algorithm, the controller may be configured to determine whether it is raining, snowing, foggy, sunny, cloudy, or the like prior to landing or take-off based on the averaged image.

By way of another example, where a first environmental condition external to the aircraft is determined at the first position, the controller, using the trained machine learning algorithm, may be configured to perform fast detection at the second position to determine a weather conditional external to the aircraft based on the second image of the second calibration target 119.

In a step 312, one or more real-time calibration parameters may be determined based on the determined environmental conditions at the first and second position. For example, using the machine learning algorithm, the controller may be configured to determine one or more real-time calibration parameters based on the determined environmental conditions at the first and second position. It is noted that the machine learning algorithm used to determine the one or more real-time calibration parameters may be the same or different machine learning algorithm used to determine the real-time environmental conditions.

In a step 314, one or more factory calibration parameters may be adjusted based on the determine one or more real-time calibration parameters.

It is noted herein the method or process 300 is not limited to the steps and/or sub-steps provided. The method or process 300 may include more or fewer steps and/or sub-steps. The method or process 300 may perform the steps and/or sub-steps simultaneously. The method or process 300 may perform the steps and/or sub-steps sequentially, including in the order provided or an order other than provided. Therefore, the above description should not be interpreted as a limitation on the scope of the disclosure but merely an illustration.

Although embodiments of the present disclosure are directed to the aircraft controller 102 determining calibration parameters of the imaging device in real-time (or near real-time) via one or more steps of the method or process 300, as defined by the one or more sets of program instructions 108, it is noted herein that the one or more offboard controllers 124 may be configured to determine calibration parameters of the imaging device in real-time (or near real-time) via one or more steps of the method or process 300, as defined by the one or more sets of program instructions 130, before transmitting the determined calibration parameters to the aircraft controller 102 for adjustment of the imaging devices 118. Therefore, the above description should not be interpreted as a limitation on the scope of the present disclosure but merely an illustration.

Further, although embodiments of the present disclosure are directed to an aircraft 100, it is noted that embodiments of the present disclosure may be directed to any suitable aviation vehicle including, but not limited to, a helicopter, drone, autonomous air vehicle, or the like.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system, the system comprising:
   one or more imaging devices, the one or more imaging devices coupled to one or more external surfaces of an aircraft, the one or more imaging devices configured to generate a first set of images of a first calibration target positioned at a first position and an additional set of images of an additional calibration target positioned at an additional position, wherein the first position is different from the additional position, the first calibration target including a first calibration pattern, the additional calibration target including a second calibration pattern; and
   one or more controllers communicatively coupled to the one or more imaging devices, the one or more controllers including one or more processors configured to executed a set program instructions stored in a memory, the one or more controllers including a machine learning algorithm stored in memory, the set of program instructions configured to cause the one or more processors to:
   receive the first set of images of the first calibration target positioned at the first position from the one or more imaging devices;
   receive the additional set of images of the additional calibration target positioned at the additional position from the one or more imaging devices;
   determine one or more environmental conditions external to the aircraft at the additional position; and
   determine one or more real-time calibration parameters for the one or more imaging devices based on the one or more environmental conditions.

2. The system of claim 1, wherein the one or more controllers are further configured to:
   store the received first set of images of the first calibration target positioned at the first position from the one or more imaging devices;
   generate an average image by averaging the received first set of images of the first calibration target and the additional set of images of the additional calibration target and
   determine the one or more environmental conditions external to the aircraft at the additional position based on the generated average image.

3. The system of claim 1, wherein the one or more controllers are further configured to:
   determine a first environmental condition external to the aircraft at the first position based on the received first set of images using the machine learning algorithm; and
   determine an additional environmental condition external to the aircraft at the additional position based on the additional set of images of the additional calibration target.

4. The system of claim 1, wherein the one or more controllers are further configured to:
   adjust one or more factory calibration parameters based on the determined one or more real-time calibration parameters.

5. The system of claim 1, wherein the one or more controllers are further configured to:
   receive one or more training images, the one or more training images including one or more weather condition images; and train the machine learning algorithm based on the received one or more training images.

6. The system of claim 1, wherein one of the first calibration pattern or the additional calibration target comprises a fixed calibration pattern.

7. The system of claim 1, wherein one of the first calibration pattern or the additional calibration target comprises a dynamic calibration pattern.

8. The system of claim 6, wherein one of the first calibration target or the additional calibration target comprises a digital display device.

9. The system of claim 1, wherein one of the first position of the first calibration target or the additional position of the additional calibration target comprises:
a taxiway position, a runway position, or a position outside an airport.

10. A method comprising:
receiving a first set of images of a first calibration target positioned at a first position from one or more imaging devices, the one or more imaging devices coupled to one or more external surfaces of an aircraft, the first calibration target including a first calibration pattern;
receiving additional set of images of an additional calibration target positioned at an additional position from the one or more imaging devices, the additional position different from the first position, the additional calibration target including an additional calibration pattern;
determining one or more environmental conditions external to the aircraft at the additional position; and
determining one or more real-time calibration parameters for the one or more imaging devices based on the determined one or more environmental conditions.

11. The method of claim 10, further comprising:
storing the received first set of images of the first calibration target positioned at the first position from the one or more imaging devices;
generating an average image by averaging the received first set of images of the first calibration target and the additional set of images of the additional calibration target and
determining the one or more environmental conditions external to the aircraft at the additional position based on the generated average image.

12. The method of claim 10, further comprising:
adjusting one or more factory calibration parameters based on the determined one or more real-time calibration parameters.

13. The method of claim 10, further comprising:
receiving one or more training images, the one or more training images including one or more weather condition images; and
training the machine learning algorithm based on the received one or more training images.

14. The method of claim 10, wherein one of the first calibration pattern or the additional calibration target comprises at least one of:
a fixed calibration pattern or a dynamic calibration pattern.

15. The method of claim 10, wherein one of the first position of the first calibration target or the additional position of the additional calibration target comprises:
a taxiway position, a runway position, or a position outside an airport.

* * * * *